July 18, 1967 W. V. SORNSEN 3,331,412
TIRE HOLDING APPARATUS
Filed April 25, 1966 2 Sheets-Sheet 1
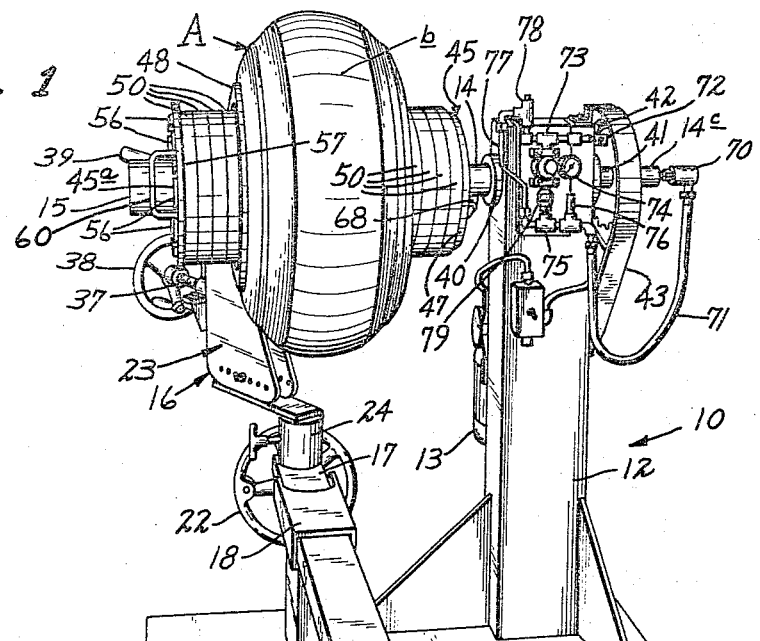
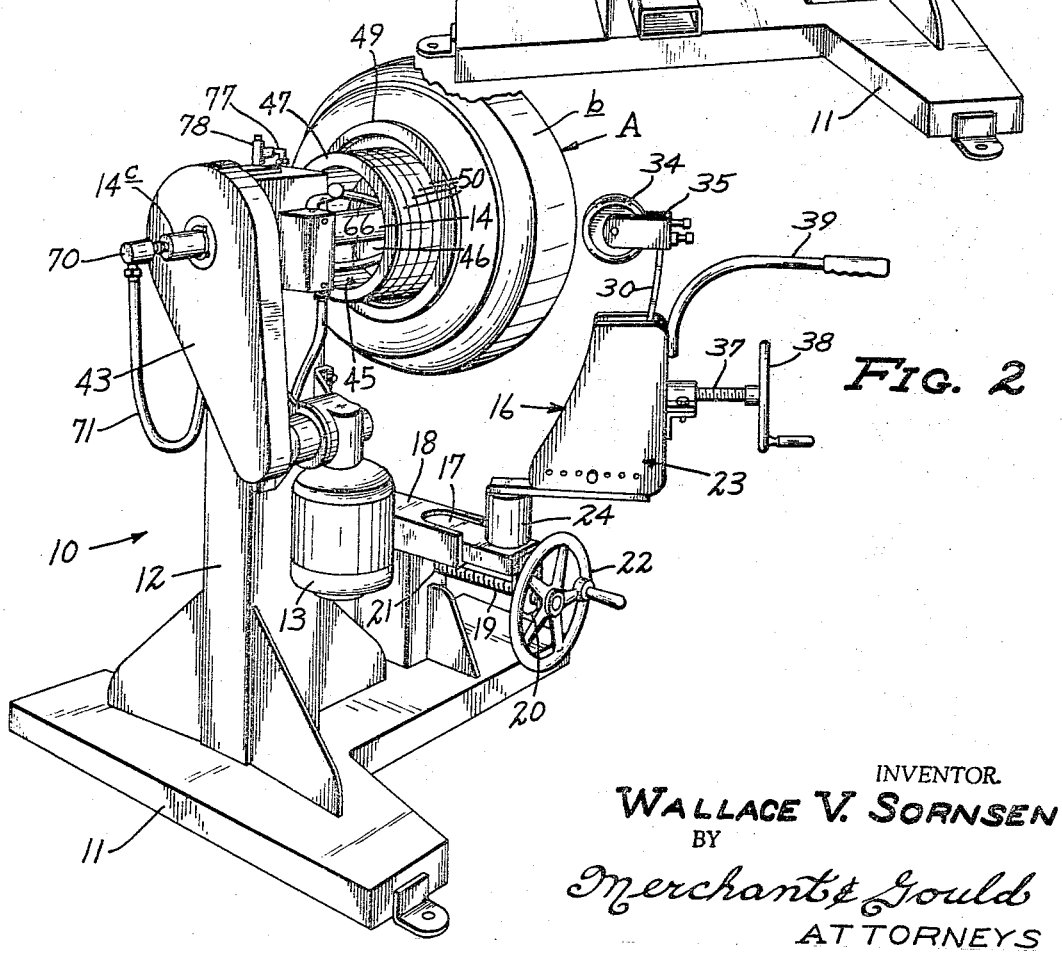
INVENTOR.
WALLACE V. SORNSEN
BY
Merchant & Gould
ATTORNEYS

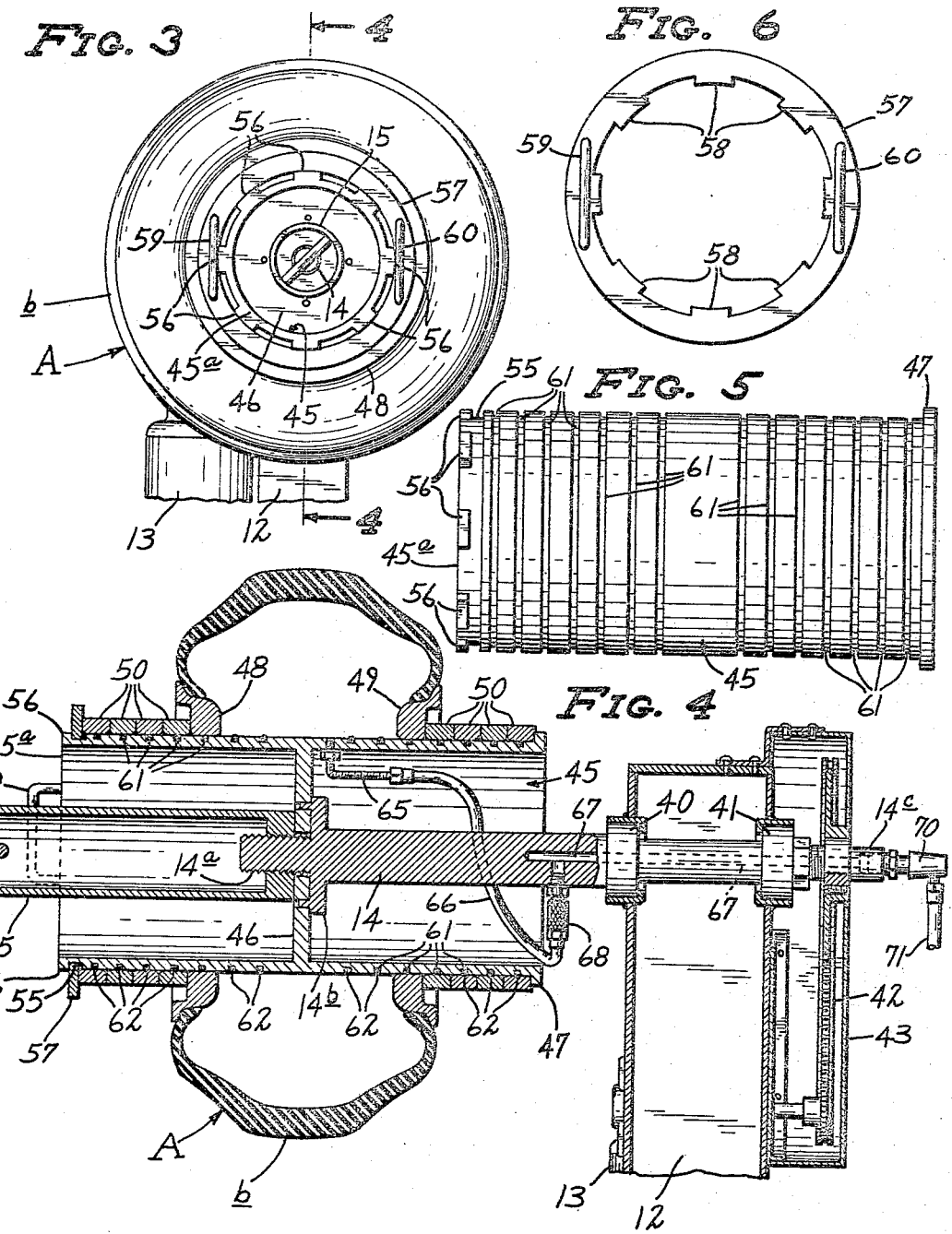

United States Patent Office 3,331,412
Patented July 18, 1967

3,331,412
TIRE HOLDING APPARATUS
Wallace V. Sornsen, Minneapolis, Minn., assignor to Paul E. Hawkinson Company, Minneapolis, Minn., a corporation of Minnesota
Filed Apr. 25, 1966, Ser. No. 545,090
5 Claims. (Cl. 144—288)

My invention relates generally to tire repair equipment and more particularly relates to tire repair equipment utilized in the tire recapping industry.

My invention relates to improved apparatus for mounting the tire on a tire rebuilding machine. The basic machine includes a stitching mechanism for mounting a strip of camelback on the buffed crown of a tire mounted on the machine in a rolling radius condition, that is, with the beads of the tire spread and the diameter thereof reduced as disclosed in Patent 1,917,262 that issued July 11, 1933.

In recapping operations it is conventional to mount a tire carcass, and the rim on which it is mounted, on a rotary power head for common rotation with the power output shaft. A strip of uncured rubber or camelback is loosely adhered to the buffed crown portion of the tire carcass. Thereafter the strip of camelback is caused to be tightly adhered to such a carcass by means of a stitching wheel which is brought into engagement with the strip of camelback and moved through an arc of travel corresponding generally to the crown radius of the tire during rotation of the tire.

My invention relates to an improved apparatus for holding and spreading the tire during the recapping operation. The recapping operation used herein is the "Hawkinson" system, as taught by United States Reissue Patent 21,956 and U.S. Patents 2,282,578 and 2,282,579. These patents teach the treading or retreading of pneumatic tires by curing the tread portion to the tire casing in a matrix or mold having a diameter less than the normal expanded diameter of the tire. The radius of the mold is approximately equal to the distance between the ground and the axis of the tire when the tire is mounted on a vehicle and properly inflated. This shortened radius is known in the trade as the "rolling radius" of the tire.

Prior to the time that the tire is placed in the matrix or mold, several operations are required to properly prepare the tire carcass. The crown portion of the tire is first abraded or buffed to provide a good bonding surface. This can be done by rotating the tire on a fixed axis while a rotary rasp or buffing wheel is applied to the crown surface. After the buffing is completed, the roughened crown surface is given a coat of adhesive such as rubber cement.

The next step in retreading a tire in a rolling radius condition consists of spreading the beads of the tire apart to thereby circumferentially contract the crown portion of the tire until the tire reaches its approximate rolling radius. While the tire is contracted to its approximate rolling radius, a strip of uncured rubber material or camelback is mounted loosely to the previously buffed and adhesive covered crown portion. The camelback is thereafter caused to be adhered tightly to the crown portion by means of a stitching mechanism.

After the camelback is stitched to the crown portion of the tire, the tire is placed in a matrix having a diameter corresponding to the rolling radius of the tire. The matrix or mold is then heated to cure the tread.

The apparatus of my invention is utilized during the buffing and stitching operation to hold the tire in its rolling radius condition. The tire carcass is detachably mounted on a rim member that rotates with the output shaft of a tire stitching machine. Means are provided to inflate the tire so that it provides a firm surface to which the new tread can be stitched.

The apparatus of my invention can be utilized in the recapping of conventional tires although it is intended specifically for use in the retreading of so-called "radial" tires or in the building up of conventional tires to convert them into radial tires by a retreading process. A radial tire is one in which a belt of nonelastic material such as Fiberglas is imbedded in the tire tread. The fibers in the belt run parallel to each other and around the circumference of the tire to form a rigid hoop that holds the tire to its rolling radius. To convert a conventional tire to a radial tire by a retreading process, the above described buffing and adhesive applying steps are carried out. The beads of the tire are then spread until the tire reaches its rolling radius condition. The nonelastic band or belt of material is then placed about the tire, and the camelback is applied over the nonelastic belt. The belt and the tread material are then stitched to each other and to the crown portion of the tire prior to the curing operation.

It is therefore a primary object of my invention to provide apparatus for holding and spreading a tire carcass in its rolling radius condition during a retreading operation.

A further object of my invention is to provide apparatus upon which a tire carcass can be quickly mounted and inflated to its rolling radius condition during a stitching operation.

Another object of my invention is to provide a rim member upon which a tire carcass can be mounted and inflated to its rolling radius condition while a belt of nonelastic material is placed about its circumference and imbedded in the tread of the tire.

Yet another object of my invention is to provide apparatus for retreading different size tires, including a single cylindrical rim member or drum on which tires are mounted by means of correctly sized annular flange members slidably mounted on the drum and positioned thereon by a plurality of spacer rings, the drum having a plurality of annular rubber rings mounted in grooves therein to seal the space between the drum and the annular flanges so that the tire can be inflated while mounted thereon.

These and other objects of my invention will become apparent to those skilled in the art when the accompanying specification and claims are considered in connection with the accompanying drawings, in which:

FIG. 1 is a view in perspective showing a tire rebuilding machine utilizing my novel tire holding and spreading apparatus;

FIG. 2 is another view in perspective of the tire rebuilding machine of FIG. 1, also utilizing my novel construction;

FIG. 3 is an enlarged elevational view of a portion of FIG. 1, disclosing the tire holding apparatus of my invention as viewed from one end thereof;

FIG. 4 is a view in vertical section as seen from line 4—4 of FIG. 3;

FIG. 5 is an elevational view of the tire mounting rim member according to my invention; and FIG. 6 is an end elevational view of a locking ring used in my invention.

Referring now to the drawings, wherein like reference characters indicate like parts throughout the several views, there is disclosed in FIGURES 1 and 2 a tire rebuilding machine 10 in which my invention is employed. Machine 10 includes a base 11 that supports a standard 12. A power head having a gear head equipped, electrically operated motor 13 is carried by standard 12 and is adapted to drive a horizontally disposed, laterally projecting rotary output shaft 14. Mounted on output shaft 14, for common rotation therewith, is a tire carcass A to be worked upon.

Machine 10 also includes a stitching mechanism indicated generally in the numeral 16. Stitching mechanism 16 includes a horizontally disposed carriage 17 that generally underlies the extended tire A and is mounted for limited horizontal movements normal to shaft 14 by means of a way element 18 carried by base 11. Such horizontal movements are imparted by means of a threaded shaft 19 that is journalled for rotation at its outer end to carriage 17 by a bearing bracket 20 and that has threaded engagement with way element 18 as at 21. To facilitate adjustment of carriage 17, shaft 19 is provided as its outer end with an enlarged wheel-like crank 22.

A stitching wheel mounting head 23 is mounted on carriage 17 for pivotal swinging movements about a vertical axis by means of a vertically disposed sleeve-like bearing 24 carried by a post (not shown) on carriage 17. An elongated resilient arm 30 has its lower end pivotally secured within the lower portion of mounting head 23. A stitching wheel 34 is journalled for rotation to the upper end of arm 30 by means of a bifurcated bracket 35.

For the purpose of imparting movement to stitching wheel 34 toward the crown b of tire A, there is provided a movable element in the nature of a threaded shaft 37. Shaft 37 has threaded engagement with mounting head 23, and the inner end of shaft 37 engages an intermediate portion of arm 30. An enlarged wheel-like crank 38 is secured to the outer end of shaft 37 to facilitate rotation of the shaft 37. Rotation of crank 38 thus causes movement of stitching wheel 34 either toward or away from tire A. Mounting head 23 is pivoted about its vertical axis by means of a handle 39.

The tire holding and spreading apparatus of my invention, although disclosed in FIGS. 1 and 2, is shown in more detail in FIGS. 3–6. In FIG. 4 it can be seen that output shaft 14 is journalled for rotation within standard 12 by means of a pair of journal bearing assemblies 40 and 41. Output shaft 14 is caused to rotate upon the energization of motor 13 by means of a drive assembly 42 carried within a housing 43.

The outwardly extending end of shaft 14 is equipped with a threaded portion 14a. Formed at the rear of threaded portion 14a is a radially extending stop member 14b. An elongated tubular nut 15 is adapted to threadedly engage threaded end portion 14a.

Mounted on output shaft 14 for rotation therewith is an elongated tubular or cylindrical rim member or drum 45 having a longitudinal axis of rotation that corresponds with the axis of rotation of output shaft 14. Rim member 45 is mounted on shaft 14 by means of a centrally mounted interior support member 46 equipped with an axial hole through which threaded end portion 14a extends. Support member 46 is thus held firmly between stop member 14b and tubular nut 15. Stop member 14b can be equipped with a plurality of laterally extending pins, and support member 46 can be equipped with a like plurality of holes into which the pins extend, as shown, in order to prevent relative rotation between rim member 45 and shaft 14.

Formed on a first end of rim member 45 adjacent standard 12 is a radially projecting retaining rim 47. Slidably mounted on rim member 45 are a pair of annular bead supporting flanges 48 and 49. Flanges 48 and 49 have an inside diameter slightly larger than the outside diameter of rim member 45 so that they are freely slidable thereon. The outside dimensions of flanges 48 and 49 correspond to the dimensions of the tire being worked upon. It is thus apparent that different size tires can be mounted on rim member 45 if appropriately sized bead supporting flanges 48 and 49 are used.

Also mounted on rim member 45 are a plurality of spacer rings such as 50. Spacer rings 50 have an inside diameter equal to that of flanges 48 and 49 so that they are also freely slidable over rim member 45. Spacer rings 50 are adapted to be mounted between the flanges and the ends of rim member 45 to space the flanges from the ends. In the specific example shown in FIG. 4, four spacer rings 50 are mounted between flange 49 and retaining rim 47 to prevent movement of flange 49 toward rim 47. Another group of four spacer rings 50 are mounted between flange 48 and the other end 45a of rim member 45 to prevent movement of flange 48 toward that end. Tire carcass A is mounted between flanges 48 and 49 so as to permit the inflation thereof.

Flanges 48 and 49, and spacer rings 50 are all inserted over second end 45a of rim member 45 and are prevented from being pushed off the other end of rim member 45 by retaining rim 47. Once the flanges and spacer rings are mounted on rim member 45, however, means must be provided to prevent their being forced off second end 45a. Referring to FIG. 5, it can be seen that rim member 45 has a relatively wide groove 55 formed adjacent second end 45a. Groove 55 extends into the surface of rim member 45 around the entire periphery thereof. Extending or projecting from groove 55 are a plurality of evenly spaced lugs 56. Lugs 56 lie directly adjacent end 45a so that a portion of wide groove 55 remains open around the entire periphery of rim member 45. Lugs 56 extend outwardly a distance no greater than the outside diameter of rim member 45 so that flanges 48 and 49 and spacer rings 50 can be inserted over them.

Designed to mesh with lugs 56 and groove 55 is a locking ring 57 having an inside diameter equal to the outside diameter of rim member 45 and having a plurality of generally evenly spaced lugs 58 extending inwardly therefrom. Locking ring 57 is adapted to slide over second end 45a with lugs 58 passing between lugs 56. Locking ring 57 is of the same thickness as the fully open portion of wide groove 55 so that it can be rotated therein to place lugs 58 behind lugs 56 as shown in FIGS. 3, 4. With locking ring 57 in this position, the flanges and spacer rings cannot be removed from rim member 45. A pair of handles 59 and 60 are provided on locking ring 57 to facilitate its insertion and removal.

Also formed within the surface of rim member 45 are a plurality of evenly spaced grooves 61. Each of the annular grooves 61 lies in an individual plane that extends perpendicular to the axis of rim member 45. Grooves 61 are spaced on rim member 45 such that when spacer rings 50 and flanges 48 and 49 are mounted thereon in an operative relationship, a single groove 61 lies beneath a central portion of each of the flanges 48 and 49 and spacer rings 50.

Mounted within each of grooves 61 is a flexible sealing ring or O-ring such as 62. Each ring or gasket 62 has a diameter greater than the diameter of the groove 61 in which it is mounted so that it extends beyond the outside diameter of rim member 45. In the preferred embodiment, rings 62 are made of rubber and extend slightly beyond the surface of rim member 45 to thereby provide an air seal between the rim member and flanges 48 and 49 and between the rim member and spacer rings 50, as shown in FIG. 4.

When tire carcass A is mounted between flanges 48 and 49 as shown in FIG. 4, it is necessary to inflate the tire so that stitching wheel 34 has a solid crown surface b against which to work. A threaded air insertion tube 65 is thus mounted within rim member 45 and extends through the surface thereof to provide open communication with the interior of tire A. Attached to the end of tube 65 is a flexible hose 66. Since rim member 45 rotates with shaft 14, some conduit means must be provided to inflate tire A either while it is rotating or while it is motionless, but without requiring the removal of the air inserting apparatus during operation of the machine. This is done by providing an axial passage 67 within shaft 14. A second threaded air insertion tube, such as a quick release coupling, 68 is mounted in an opening in shaft 14 that communicates with axial passage 67. Coupling 68 is connected to flexible hose 66. Mounted on the end 14c of shaft 14 adjacent housing 43 in fluid communicating relationship with axial passage 67 is a rotary air connector 70 through which air is inserted by means of a flexible hose 71. Rotary connector 70 is designed such that even though end 14c is rotating, connector 70 remains in a fixed position, although always allowing air to enter axial passage 67. Tire A is therefore inflated by means of air entering from hose 71 and passing through rotary connector 70, axial passage 67, coupling 68, flexible hose 66, and tube 65.

The control system for the air supply is disclosed in FIG. 1. Air from a compressor or other source (not shown) is connected to a main air supply port 72. The air then passes through a T-connection 73, through a pressure regulator and gauge 74, through a T-connection 75, and through a pop-off valve 76 that is connected to flexible hose 71. Under normal conditions, the pressure in tire A is maintained at a known value by means of pressure regulator 74. This pressure is indicated on the attached gauge. To facilitate a rapid initial inflation of tire A, a bypass line 77 around pressure regulator 74 is provided. Mounted within bypass line 77 is a manual air valve 78 that is normally closed. Bypass line 77 has one end connected to T-connector 73 and the other end connected to T-connector 75. When rapid inflation of tire A is desired, manual valve 78 is opened so that air directly from supply port 72 is forced into tire A via bypass line 77 and flexible hose 71. A check valve 79 is mounted in the air line between pressure regulator 74 and T-connector 75 to prevent air from moving upwardly through pressure regulator 74. Pop-off valve 76 is provided to prevent an excessive pressure build up within tire A in case of a system malfunction.

The tire holding and spreading apparatus of my invention provides a simple and effective means for detachably mounting a tire carcass for a treading or retreading operation. The tire is first rapidly mounted as follows. A first group of spacer rings 50 are inserted over second end 45a of rim member 45 and are forced toward the other end until they come in contact with retaining rim 47. Annular flange 49, of the appropriate size, is then inserted over end 45a and pressed against spacer rings 50. Tire carcass A is then inserted, after which annular flange 48 is inserted. A second group of spacer rings 50 are then slipped over second end 45a to properly space flanges 48 and 49. Locking ring 60 is then mounted in groove 55 and rotated to its locking position. The air supply is then activated and manual valve 78 is opened to provide the initial inflation of tire A. Once the tire has been inflated to the proper pressure, manual valve 78 is permitted to close and the pressure is maintained by pressure regulator 74. The air cannot escape from tire A because the beads of tire A are tightly sealed against flanges 48 and 49, and rubber rings 62 prevent the air from escaping between flanges 48 and 49 and rim member 45. With the tire inflated, the buffing and the stitching operations can be carried out. After the stitching operation is completed, the tire can be quickly removed by bleeding the air from it and reversing the mounting process previously described.

It is noted that tires of many different diameters can easily be accommodated by my apparatus simply by utilizing the appropriate size bead supporting flanges. The extent to which any given tire is spread is determined by the number of spacer rings that are utilized. By utilizing fewer spacer rings, the radius of the tire during the recapping operation can be reduced to any desired level within the capabilities of the tire. My invention has been thoroughly tested and found to be completely satisfactory for the accomplishment of the above objects. While I have shown and described a preferred embodiment, I wish it to be understood that it is capable of modification without departure from the spirit and scope of the appended claims.

What is claimed is:
1. Apparatus for retreading a tire, comprising:
 (a) an elongated tubular rim member having a longitudinal axis and first and second ends, said rim member having an outside diameter smaller than the diameter of the central opening of a given pneumatic tire casing;
 (b) said rim member having a radially projecting retaining rim on said first end;
 (c) a pair of annular bead supporting flanges slidably mounted on said rim member adapted to engage the opposing beads of a pneumatic tire, said flanges having an inside diameter slightly larger than said outside diameter of said rim member;
 (d) a plurality of spacer rings having an inside diameter equal to that of said flanges and adapted to be mounted between said flanges and said ends to space said flanges from said ends;
 (e) said rim member having a plurality of evenly spaced annular grooves formed therein;
 (f) a flexible sealing ring having a cross-sectional diameter greater than the depth of said grooves mounted in each of said grooves so as to extend beyond the outside diameter of said rim member to thereby provide an air seal between said rim member and said flanges and between said rim member and said spacer rings;
 (g) said rim member having a single relatively wide groove formed adjacent said second end;
 (h) a plurality of generally evenly spaced lugs projecting from said wide groove and extending radially to a diameter equal to that of said rim member, said lugs lying adjacent said second end so that a portion of said wide groove remains open around the entire rim member; and
 (i) a locking ring having an inside diameter equal to the outside diameter of said rim member and having a plurality of generally evenly spaced lugs extending inwardly therefrom adapted to slide over said second end of said rim member and be rotated in said wide groove to lock behind said lugs on said rim member to thereby support said tire between said flanges during the inflation thereof.

2. In a tire stitching machine having a base, a standard on said base, a power head on said standard including a horizontally disposed rotary output shaft projecting laterally from said power head in overlying relationship to said base, and a stitching mechanism carried by said base in laterally spaced relation to said standard, means for detachably mounting a pneumatic tire on said output shaft for common rotation therewith, comprising:
 (a) a cylindrical rim member having a longitudinal axis and first and second ends, said rim member having a radially projecting retaining rim on said first end;
 (b) means for detachably mounting said rim member with the longitudinal axis thereof aligned with the longitudinal axis of the rotary output shaft for rotation therewith;
 (c) a pair of annular bead supporting flanges slidably mounted on said rim member adapted to engage the opposing beads of a pneumatic tire;
 (d) a plurality of spacer rings mounted between said flanges and said ends on said rim member to space said flanges from said ends;
 (e) means for sealing the space between said flanges and said rim member so that air cannot escape from a pneumatic tire mounted between said flanges; and
 (f) means including a locking ring mounted on said second end for holding said flanges and said spacer rings on said rim member to prevent lateral movement of said flanges when air is inserted into a pneumatic tire mounted between them.

3. The tire stitching machine of claim 2 wherein said means for sealing the space between said flanges and said rim member include at least two annular grooves formed in the periphery of said rim member and positioned so as to lie beneath said pair of flanges when in operative position, and a rubber O-ring mounted in each of said grooves so as to extend above the surface of said rim member.

4. The apparatus of claim 2 including means for inflating a tire mounted between said flanges, comprising:
   (a) said output shaft having an axial passage therethrough;
   (b) conduit means connecting said axial passage to said tire;
   (c) a rotary connector attached to the end of said output shaft in fluid communicating relationship with said axial passage; and
   (d) means for providing air under pressure to said rotary connector to insert air therein and to maintain pressure in the tire during rotation thereof.

5. The apparatus of claim 4 wherein said means for providing air under pressure include:

(a) a pressure regulator, a check valve and a pop-off valve connected in series between a source of air pressure and said rotary connector; and
   (b) a bypass line having a normally closed manual valve therein, connected in parallel with said pressure regulator and said check valve.

References Cited
UNITED STATES PATENTS

| | | | |
|---|---|---|---|
| 2,423,652 | 7/1947 | Kelley | 157—1.2 |
| 2,521,149 | 8/1950 | Butler | 157—1.2 |
| 2,614,603 | 10/1952 | Houbey | 152—404 |
| 2,969,096 | 1/1961 | Smyser. | |

WILLIAM W. DYER, Jr., *Primary Examiner.*

R. J. ZLOTNIK, *Assistant Examiner.*